UNITED STATES PATENT OFFICE.

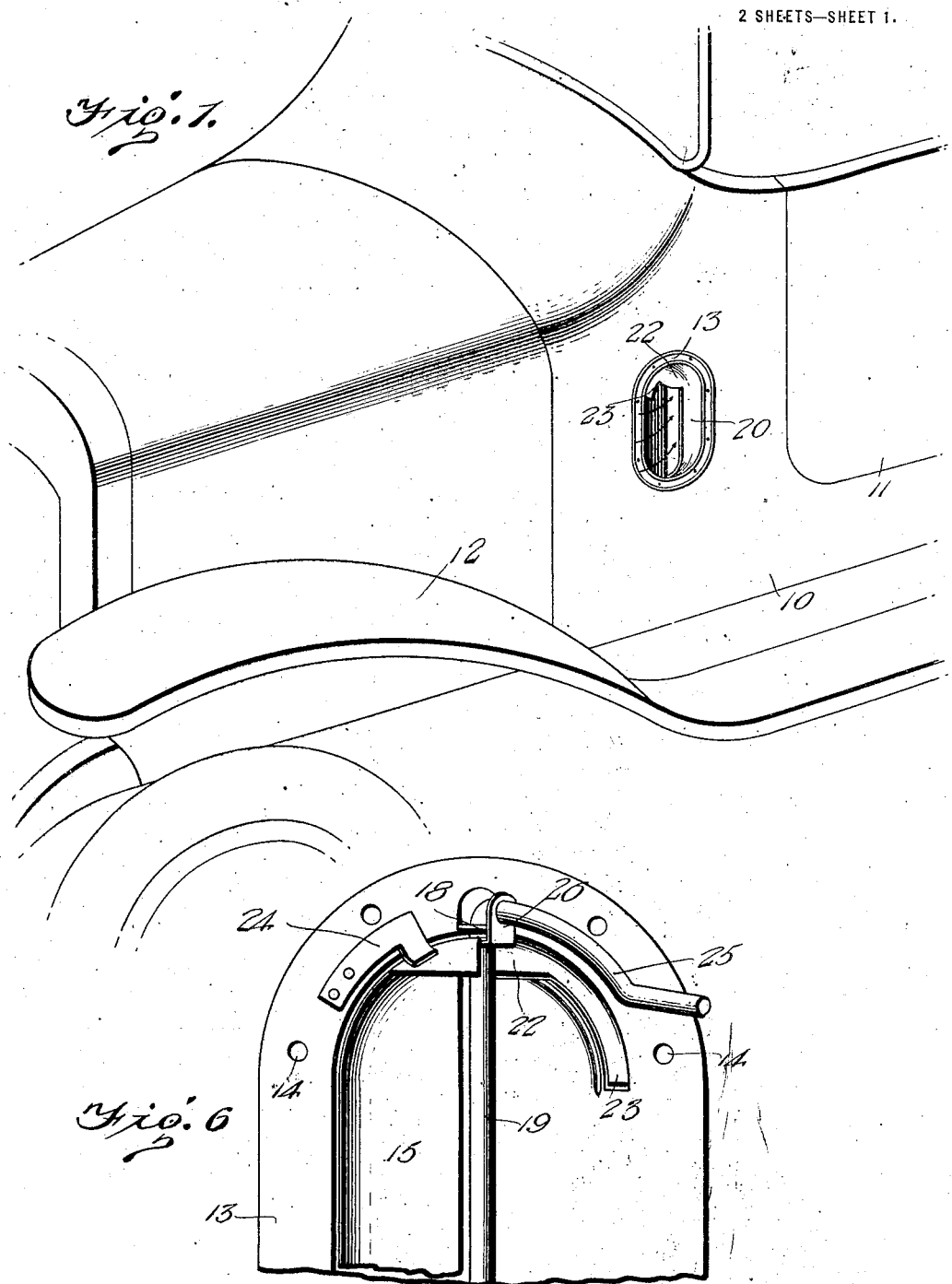

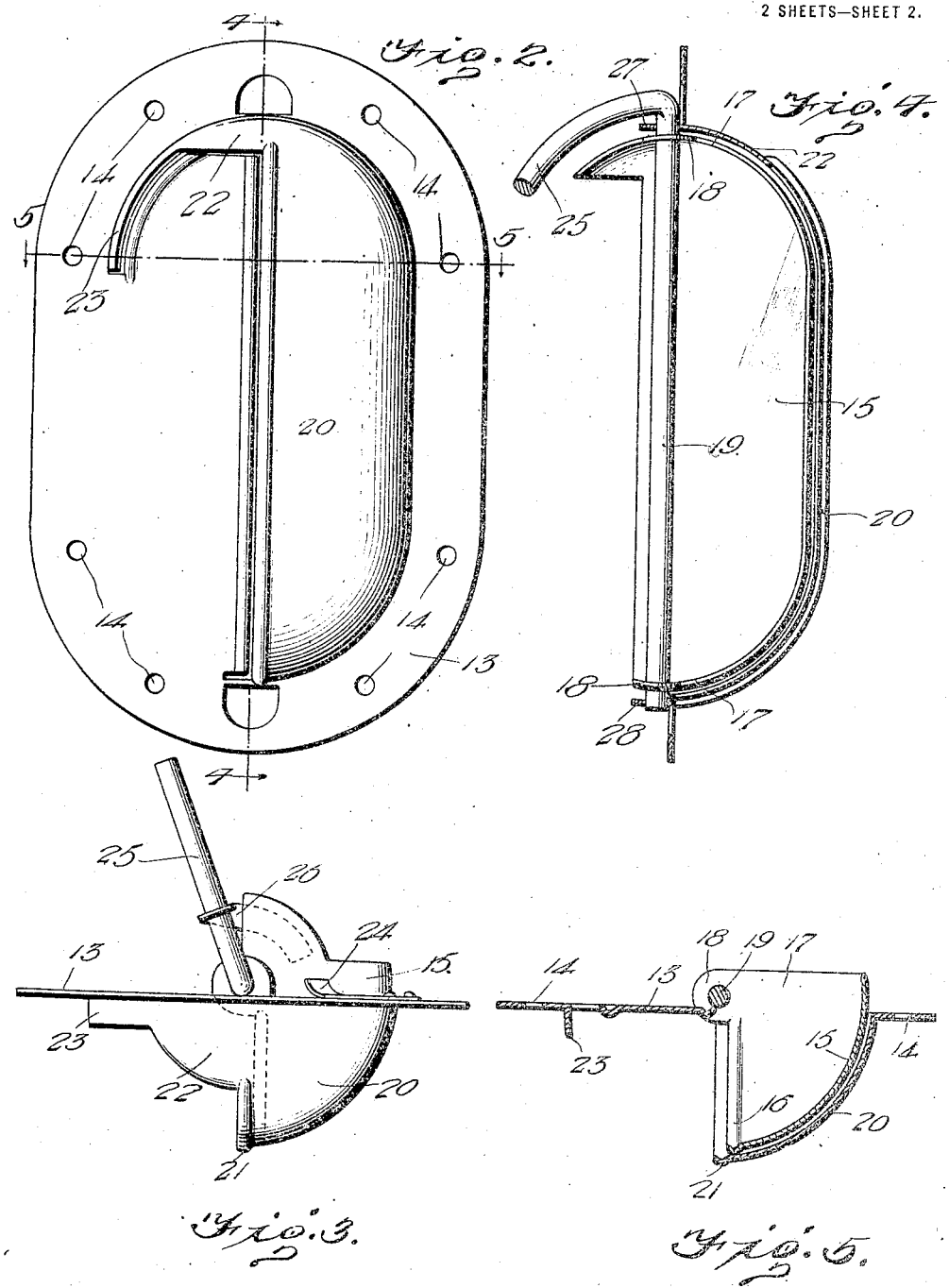

HARRY DANIEL DUCKHAM AND HENRY JOHN PFEIFFER, OF KENTON, OHIO.

VENTILATOR.

1,290,936.   Specification of Letters Patent.   Patented Jan. 14, 1919.

Application filed July 3, 1918. Serial No. 243,187.

*To all whom it may concern:*

Be it known that we, HARRY D. DUCKHAM and HENRY J. PFEIFFER, citizens of the United States, and residents of Kenton, in the county of Hardin and State of Ohio, have made certain new and useful Improvements in Ventilators, of which the following is a specification.

Our present invention relates generally to ventilators and more particularly to automobile ventilators, our object being the provision of a simple inexpensive ventilating device, whereby the feet and lower limbs of an operator of an automobile may be provided with a sufficient quantity of fresh cool air to offset the radiation of heat from the engine into the fore-part of the automobile body below the cowl.

In the accompanying drawings which illustrate our present invention and forming a part of this specification:

Figure 1 is a perspective view illustrating the practical application of our invention;

Fig. 2 is an elevation looking at the outer side of the ventilating device removed;

Fig. 3 is a top plan view thereof;

Fig. 4 is a vertical section taken substantially on line 4—4 of Fig. 2;

Fig. 5 is a horizontal section taken substantially on line 5—5 of Fig. 2, and,

Fig. 6 is an elevation of the upper portion of the device looking at the inner side thereof.

Referring now to these figures, our invention proposes the formation of an opening in the fore-part of an automobile body generally indicated at 10, the opening being located in front of the fore-door 11 and at a point sufficiently below the cowl to bring the same within an area in which it will be protected from flying particles by the adjacent front fender 12.

Around this opening is secured a vertically elongated plate or holder 13 having rounded ends and having openings 14 in a series adjacent its edge for the reception of suitable fastening members for securing the same to the automobile body.

Plate 13 has a vertically elongated opening at one side of its longitudinal axis for the reception of an adjustable ventilating shield 15, the curved body of which may have strengthening ribs 16 along its forward or outer edge and has upper and lower curved flanges 17 forming the top and base thereof and provided with ears 18 receiving and secured to a vertical pivot shaft 19 located slightly in the rear of the plate or holder 13, and substantially in the plane of the vertical longitudinal axis of the latter.

Extending outwardly from the plate or holder 13, and from the outer edge of its opening above referred to, is a curved hood 20 whose free edge terminates substantially in the plane of the vertical longitudinal axis of said plate or holder and may be provided with a strengthening rib 21, and whose ends are curved to conform to the curvature of the adjustable shield 15, the upper end thereof being merged into a curved cowl 22, protecting the opening of the holder 13 from falling rain and the like.

The cowl portion 22 terminates beyond the hood 20 in a curved extension 23, which may be bent from an integral slotted portion of the holder 13, and which serves as a clasp to engage the free edge of the shield 15, when the latter is thrown outwardly and forwardly to its closed position so as to coöperate with an inner spring clasp 24 carried by the holder 13 and engageable with the upper angularly bent handle portion 25 of the pivot shaft 19 to hold the parts in closed position, this handle portion being connected to the upper portion of the shield 15 by a rigid connecting piece 26.

The upper and lower portions of the pivot shaft 19 have bearing in rearward extensions 27 adjacent the upper and lower portions of the holder 13, and thus when the upper angular handle 25 of said shaft, which handle projects inwardly through the opening of the automobile body so as to remain at all times within easy reach of the operator of the machine, is shifted, the ventilating shield 15 may be moved either inwardly or rearwardly to the open position shown in Fig. 5, or forwardly to the closed position, or may in fact be moved to various positions more or less closed and dependent upon the amount of air it is desired to take in through the ventilator, the location of the latter in respect to the automobile enabling proper ventilation with a minimum amount of air, and with a device located in a protected area, although one amply exposed for the intended purposes.

Our invention thus presents a simple inexpensive solution of the difficulties now encountered in proper ventilation of automobiles, and is a sightly, readily adjustable arrangement which will effectively operate for the intended purposes at all times, will be strong and durable, and will be readily accessible for adjustment whenever this becomes necessary or desirable.

It is to be observed that by virtue of the disposition and construction of our improved ventilator, we are enabled to effectively control the air floating to the inside of the car so as to direct the same either against the driver's feet or toward the forward part of the body beneath the cowl and laterally in front of the operator.

We claim:—

1. An adjustable ventilator comprising a plate or holder having an opening at one side of its longitudinal axis and having a hood extending outwardly from the outer edge of the opening in curved relation with its free edge terminating substantially in the plane of the longitudinal axis of the hood, said holder having an upper curved outwardly projecting cowl merging at one side into the upper portion of the said hood and having a curved extension at its opposite side, a pivot shaft mounted in portions of the said holder substantially in line with its longitudinal axis and having an angular handle, and a curved adjustable shield movable within the opening of the holder, and having portions secured to the said pivot shaft, the free edge of which shield is engageable with the said extension of the cowl in closed position.

2. An adjustable ventilator of the character described comprising a vertically elongated plate or holder having upper and lower curved ends and rearwardly projecting portions adjacent said ends, a vertical pivot shaft journaled in the said extensions of the plate or holder, said plate or holder having a vertically elongated opening at one side of its vertical axis, a curved adjustable shield movable through the opening and connected to the said pivot shaft, and a hood and cowl carried by the plate or holder and coöperating with the adjustable shield, the hood being curved outwardly from the outer edge of the opening of said plate or holder, and the cowl being located at the upper end of the said opening and merging into the hood, for the purpose described.

HARRY DANIEL DUCKHAM.
HENRY JOHN PFEIFFER.

Witnesses:
JAMES F. PFEIFFER,
CHAS. R. PRICE.